Nov. 11, 1941. A. A. TOGESEN ET AL 2,262,067
ELECTRICAL DISTRIBUTION SYSTEM
Filed April 27, 1940    2 Sheets-Sheet 2

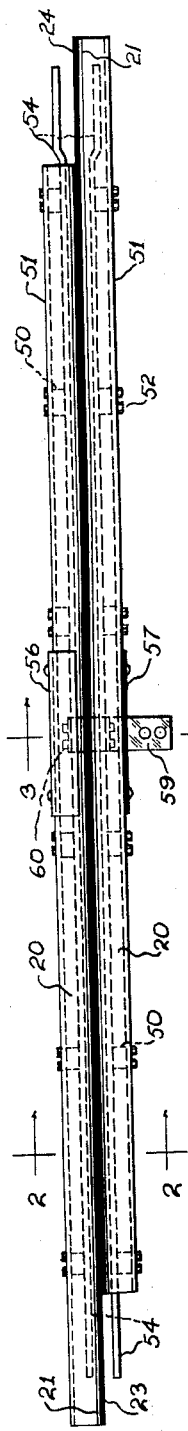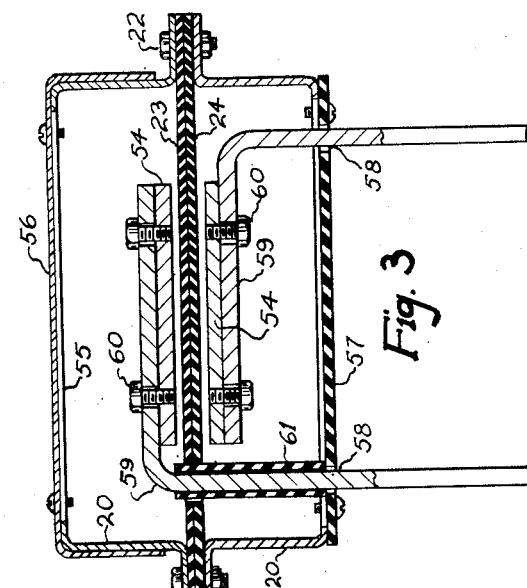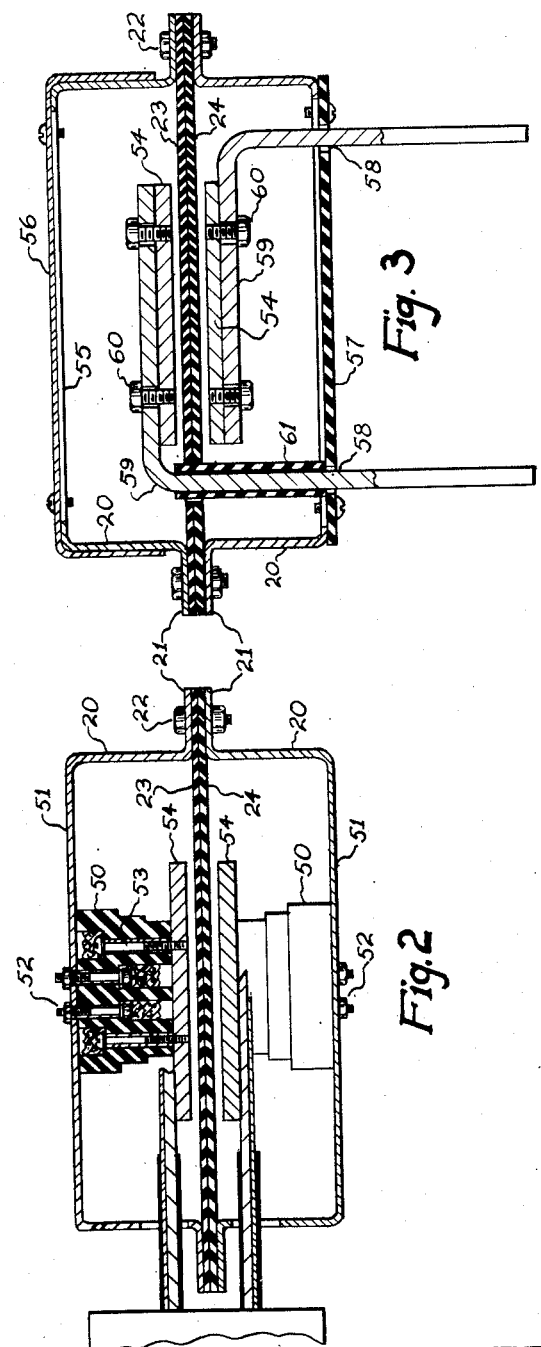

INVENTORS
Alva A. Togesen and
Lawrence E. Fisher
BY
Daniel H. Cullen
ATTORNEY.

Patented Nov. 11, 1941

2,262,067

UNITED STATES PATENT OFFICE 2,262,067

ELECTRICAL DISTRIBUTION SYSTEM

Alva A. Togesen and Lawrence E. Fisher, Detroit, Mich., assignors to Bulldog Electric Products Company, Detroit, Mich., a corporation of West Virginia Application April 27, 1940, Serial No. 331,974

14 Claims. (Cl. 174—95)

This application relates to electrical distribution systems of the bus duct type. The bus duct system here shown includes flat-laid bus bars in extremely close proximity, separated, however, by a barrier or isolating means of insulation arranged to divide the casing longitudinally into isolated long sections or compartments, each containing a bus bar. The construction is such that each bus duct section consists of a section of casing, a length of bus bar, an insulation cover, and means for insulatedly supporting the bus bar on the duct section. Two or more such sections are laid side by side and joined to form a unit length of bus duct, and two or more unit lengths are joined end to end to form a bus duct run.

For an understanding of the bus duct system herein disclosed, reference should be had to the appended drawings and to the specification which follows. In the drawings, Fig. 1 is an elevation view of a section of bus duct of the invention;

Figs. 2 and 3 are transverse views on lines 2—2, 3—3, Fig. 1;

Figure 5:
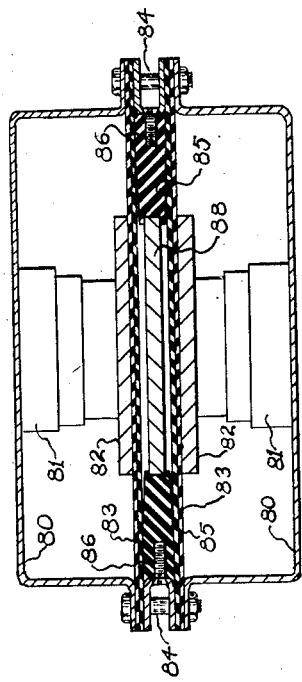
Figs. 5 to 7 show a third modification for three phase systems wherein the two outside bus bars are mounted on insulators on the outside of the duct casing and wherein the center bus bar is mounted on insulators on a center section of duct casing.

The unit length of bus duct disclosed in Figs. 1-3 is to be joined end to end to another to form a bus duct run. It consists of two long bus duct sections of which the duct sections are the channels 20, arranged edge to edge to form a casing, with each edge outwardly flanged, as at 21. Between the channels and thus closing them and isolating them from each other, and disposed between the flanges so as to be held in place by the casing joining bolts 22, is an insulation barrier means, which is in the form of two sheets 23—24 of insulation, as shown, secured to the channels individually to form individual closures for them.

Pedestal type insulators 50 of the character shown in the aforesaid patent are secured to the webs 51 of the channels by means of bolts 52, and screws 53 in these pedestals thread into tapped holes of bus bars 54 laid flat on the pedestals and disposed close to the insulation barrier means 23—24, with their flat surfaces parallel to such barrier means, to secure the bus bars in place.

For providing tap-off or connection at desired points, the webs of the channels are cut away to form hand holes 55. Normally these are covered by channel shaped plates 56 having sides cooperating with the casing sides. At any desired point where tap-off is desired, one of the hand hole cover plates may be removed and replaced by an insulation plate 57 having holes 58 through which pass angle shaped straps 59 disposed against the bus bars and secured thereto by screws 60 or the like. In the preferred construction both straps will be projected through the insulation plate 57 so that both lines will tap off, from one side of the duct. One of the straps will be passed through the barrier means 23—24 and an insulating sleeve 61 is provided to surround that strap and thus isolate it from that bus bar which is of different polarity from that strap.

The construction herein disclosed, wherein the bus bars are of flat ribbon form and are laid with their flat surfaces parallel to the plane of the split of the casing, insulated from each other by means of the insulation barrier means, has proven to be far more satisfactory for large load uses than constructions heretofore known.

It will be observed that in the bus duct section shown, there are two identical halves, each comprising a channel, an insulation plate, a bus run, and insulator supports. Each bus duct unit length formed of two bus duct sections has its ends formed for scarf-lap joining, with the insulation sheets 23—24 and the bus runs and the channels lapping, as shown.

It will be observed that an important consideration in the duct system hereof is the absence of transverse barriers which would prevent free circulation of air along the bus bars and along the duct. The bus supporting insulators are so constructed that they create little interference with free circulation. In addition, the edges of the bus bars are completely free of contact with insulators and in this way rapid travel of arcs along the edges of the bus bars is not impeded.

Figure 4:
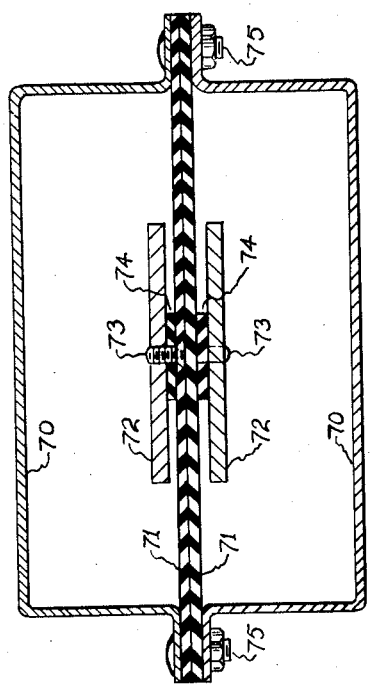
Fig. 4 is a section view showing another modification where the bus bars are mounted directly on the insulation sheet.

Referring now to Figs. 4 to 7 which show additional modifications or embodiments of the invention, it will be seen that Fig. 4 shows a construction wherein the channel shaped casing parts 70 are closed by means of insulator sheets 71, each of which carries a bus bar 72, secured thereto by means of the screws 73 passed through an insulating washer 74 and having its head embedded and countersunk in a hole of the insulating sheets 71. In a run the sections are disposed side by side with sheets 71 adjacent and bolted together by means of the outside bolt 75. The heads of screws 73 will be shielded by the insulation sheets 71, it being understood that these screws are longitudinally spaced so that no screw 73 of one bus bar is facing a screw 73 for another bus bar.

Referring to this figure, it will be observed that one set of parts 70—74 forms a complete section of bus duct which is disposed side by side against another complete section of bus duct to form a unit length of bus duct.

Figure 6:
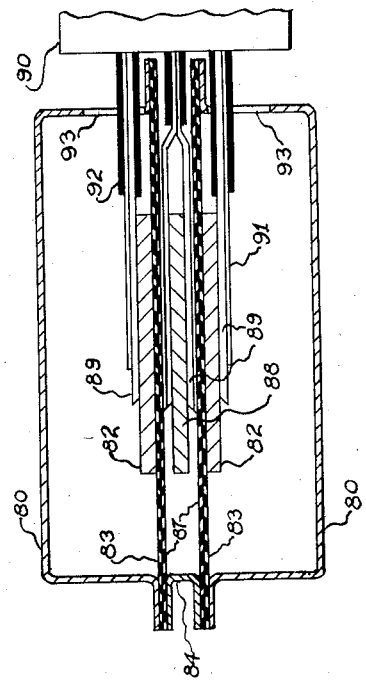
Figure 7:
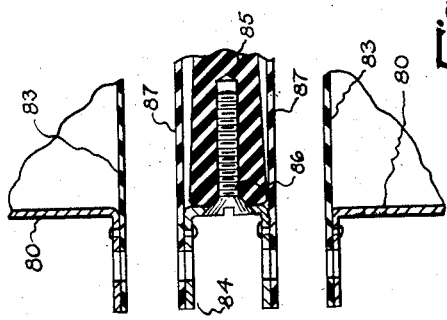

Figs. 5 to 7 show bus duct formed of channel casings 80 each of which has pedestal insulators 81 supporting bus bars 82 and closed by an insulation sheet 83.

Between the sheets 83 is a third section of bus duct, the latter comprising two channels 84 each of which mounts insulators 85 as by means of screws 86 and each of which also mounts insulation sheets 87 on opposite sides, these connecting the channels 84 to form with them and with the insulators between them and also with the bus bar 88 whose edges are supported on the insulators 85 a complete section of bus duct.

Three sections of bus duct, two of which are formed of the channels 80 and their insulators and bus bars and insulation sheets, and the third of which is formed of the channels 84 with their insulators and insulation sheets and bus bar, may be joined as indicated in Figs. 5 to 7 to form a complete bus duct.

Sides of the sheet metal duct may be perforated at intervals for the reception of prongs 89 of a plug 90 for tap-off. The prongs may be reinforced by steel springs 91 and may be shielded by tubular insulation shields 92 where they enter the duct through the holes 93.

It will be observed that in every embodiment herein disclosed a unit length of bus duct is made up of bus duct sections laid side by side to form the unit length. Each bus duct section consists of a section of casing, closed by a sheet of insulation and containing a bus bar supported from the casing either directly, as on pedestal insulators, or indirectly, as by means of the insulation sheets.

It will be observed that in systems of the character under consideration, where short circuit stresses arise, the bus bars are biased by forces consequent to such stresses in a direction away from each other. By supporting each bus on a casing section and by joining the casing sections into a rigid structure, there is produced a very satisfactory mechanical arrangement for taking care of such stresses.

It will also be observed that in the various constructions shown each bus is in its own compartment and consequently the only arc that can arise is between a bus bar and its casing.

By forming the duct in the form of individual, isolated, long cells, it is possible to ventilate and cool each cell and thus the duct as a whole without the danger of providing a short circuit pass from one bus bar to another.

It will also be observed that every construction herein disclosed represents an embodiment of the discovery that by closely spacing bus bars in a bus duct system, and isolating them from each other by means of insulation material, rather than the air insulation previously used, a more satisfactory bus duct system may be obtained, having a lower line drop than bus duct systems now known.

It will be noted that the insulation sheet between the bus bars and which extends between the sections of bus duct serve to insulate the various sections of bus duct magnetically from one another so as to prevent the establishment of a complete magnetic circuit in the duct. Therefore, we propose to use as fastening means between the duct sections, non-magnetic nuts and screws which project through the insulation. The use of these fastening means and the insulation prevents there being any magnetic circuit existing from one section of duct to the other.

Now having described the electrical distribution bus duct system herein disclosed, reference should be had to the claims which follow for a determination of the invention.

I claim:

1. Bus duct run comprising two identical long compartments, each in the form of a long channel, and each including a long insulation plate closing the open side thereof and a bus bar therein close to the plate, the compartments being disposed alongside with their plates adjacent to form a duct having a dividing barrier of insulation and a bus run on each side of the barrier.

2. An electrical distribution system bus duct comprising units joined end to end, each longitudinally divided into bus duct sections, each section of bus duct consisting of three parts, namely a long section of duct casing, a long run of bus bar, and means for insulatedly supporting the bus bar, the three parts of each section being so formed and arranged that when one long section of bus duct is disposed against another long section of bus duct, the bus bar of one will lie alongside the bus bar of the other with the duct casing being outside the two bus bars which lie alongside each other.

3. An electrical distribution system bus duct comprising units joined end to end, each longitudinally divided into bus duct sections, each section of bus duct consisting of four parts, namely a long section of duct casing, a long run of bus bar, and means for insulatedly supporting the bus bar, and an insulator barrier for the bus bar, the four parts of each section being so formed and arranged that when one long section of bus duct is disposed against another long section of bus duct, the bus bar of one will lie alongside the bus bar of the other, and insulatedly barriered therefrom with the duct casing being outside the two bus bars which lie alongside each other.

4. An electrical distribution system bus duct comprising units joined end to end, each longitudinally divided into bus duct sections, each section of bus duct consisting of three parts, namely a long section of duct casing, a long run of bus bar, and means for insulatedly supporting the bus bar, the three parts of each section being so formed and arranged that when one long section of bus duct is disposed against another long section of bus duct, the bus bar of one will lie alongside the bus bar of the other, with the duct casing being outside the two bus bars which lie alongside each other, the end of one bus duct section projecting longitudinally beyond that of its neighbor whereby a bus duct unit may be joined endwise to another bus duct unit by a lap scarf joint.

5. An electrical distribution system bus duct comprising units joined end to end, each longitudinally divided into bus duct sections, each section of bus duct consisting of four parts, namely a long section of duct casing, a long run of bus bar, and means for insulatedly supporting the bus bar, and an insulator barrier for the bus bar, the four parts of each section being so formed and arranged that when one long section of bus duct is disposed against another long section of bus duct, the bus bar of one will lie alongside the bus bar of the other, and insulatedly barriered therefrom, with the duct casing being outside the two bus bars which lie alongside each other, the end of one bus duct section projecting longitudinally beyond that of its neighbor whereby a bus duct unit may be joined endwise to another bus duct unit by a lap scarf joint, with the insulator barrier of the section which projects at the end beyond the other section also projecting at that end beyond the other insulation barrier to cooperate in forming the lap scarf joint.

6. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections.

7. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, each bus duct section comprising an open pan of U cross section, whose open side is closed by its own individual insulation closure, the closures of the pans, though separate and distinct and separately supported, being adjacent when the bus duct sections are interjoined.

8. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, each duct section comprising an open pan of U cross section, whose open side is closed by its own individual insulation closure, the closures of the pans, thought separate and distinct and separately supported, being adjacent when the bus duct sections are interjoined, each bus bar being between the bight of the pan and the insulation closure.

9. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, each duct section comprising an open pan of U cross section, whose open side is closed by its own individual insulation closure, the closures of the pans, though separate and distinct and separately supported, being adjacent when the bus duct sections are interjoined, each bus bar being between the bight of the pan and the insulation closure, and supported by the pan, rather than by the closure.

10. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, each duct section comprising an open pan of U cross section, whose open side is closed by its own individual insulation closure, the closures of the pans, though separate and distinct and separately supported, being adjacent when the bus duct sections are interjoined, each bus bar being between the bight of the pan and the insulation closure, and supported by the closure, rather than by the pan directly.

11. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, the bus duct length also including a barrier section disposed between the interjacent bus duct sections in the bus duct length, the barrier being individually complete and separate and distinct from the bus duct sections which it separates, so that three separate and distinct individually complete sections, two of bus duct, and one a barrier, may exist separately and be brought together and assembled into a bus duct length.

12. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, the bus duct length also including a barrier section disposed between the interjacent bus duct sections in the bus duct length, the barrier being individually complete and separate and distinct from the bus duct sections which it separates, so that three separate and distinct individually complete sections, two of bus duct, and one a barrier, may exist separately and be brough together and assembled into a bus duct length, the barrier section being at least partially of insulation to form an insulating barrier between the bus duct sections in the length.

13. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, the bus duct length also including a barrier section disposed between the interjacent bus duct sections in the bus duct length, the barrier being individually complete and separate and distinct from the bus duct sections which it separates, so that three separate and distinct individually complete sections, two of bus duct, and one a barrier, may exist separately and be brough together and assembled into a bus duct length, the barrier section including a section of bus bar individually supported therein.

14. A longitudinally split unit length of bus duct comprising separate and distinct individually complete complementary bus duct sections disposed alongside and interjoined at their longitudinally extending meeting edges, each bus duct section comprising a unit length of duct, a unit length of bus bar, and its own individual means for supporting the bus bar length in the duct length free and independent of any part of a complementary bus duct section, the construction being such that before complementary bus duct sections are brought adjacent and interjoined each is complete with its duct, bus bar and its bus bar supporting means, and the assembly is completed merely by interjoining the bus duct sections, each bus duct section comprising an open pan of U cross section, whose open side is closed by its own individual insulation closure, the closures of the pans, though separate and distinct and separately supported, being adjacent when the bus duct sections are interjoined, one bus duct section of the length being longitudinally offset with respect to the other so that one bus duct unit length may be joined at its end to the other by a scarf lap joint.

ALVA A. TOGESEN.
LAWRENCE E. FISHER.